United States Patent [19]
Gutierrez

[11] Patent Number: 5,155,898
[45] Date of Patent: Oct. 20, 1992

[54] ROTARY CHUCK SOFT JAWS

[76] Inventor: John P. Gutierrez, 1041 Lau Hala Canyon Rd., Vista, Calif. 92083

[21] Appl. No.: 757,610

[22] Filed: Sep. 11, 1991

[51] Int. Cl.$^5$ .............................................. B23B 31/10
[52] U.S. Cl. ...................................... 29/559; 82/1.11; 279/154
[58] Field of Search ............... 29/267, 559; 279/1 TS, 279/1 SJ, 154; 82/1.11

[56] References Cited

U.S. PATENT DOCUMENTS

| | | | |
|---|---|---|---|
| 3,945,654 | 3/1976 | McMullen | 279/1 SJ X |
| 4,041,612 | 8/1977 | Skubic | 279/1 SJ X |
| 4,223,898 | 9/1980 | Righi | 279/154 |
| 4,556,228 | 12/1985 | Ferraro | 279/1 SJ |
| 4,561,663 | 12/1985 | Ferraro | 279/123 |
| 4,640,518 | 2/1987 | Ferraro | 279/123 |
| 4,706,973 | 11/1987 | Covarrubias | 279/1 SJ |
| 4,725,065 | 2/1988 | Hiestand | 279/123 |
| 4,928,981 | 5/1990 | Brown | 279/1 SJ |

OTHER PUBLICATIONS

Advertising Brochure "Top Jaw Forming Device", and Huron Forming Device distributed about Jan. 1990.

*Primary Examiner*—Z. R. Bilinsky
*Attorney, Agent, or Firm*—Duane C. Bowen

[57] ABSTRACT

Soft jaws in a powered rotary chuck of a lathe are fixedly secured in position, during shaping of the jaws to fit a piece of work, by an annular boring fixture. The fixture is located concentric with the center of rotation of the chuck. The fixture has three sets of multiple spaced threaded openings. Each set is oriented in a like spiral relative to the center of rotation. Three bolts with threaded shanks are engaged in three of the openings. The bolts have heads fitting in counterbores in the jaws. The jaws are tightened on the heads of the bolts so that the jaws can then be shaped to the pertinent dimensions of the piece of work, then the fixture can be removed, then the piece of work can be put in the jaws, and then operations can be performed on the piece of work as it is being rotated by the chuck. Bolts of different diameter heads can be used to help orient the bolts to the locations of the counterbores.

8 Claims, 3 Drawing Sheets

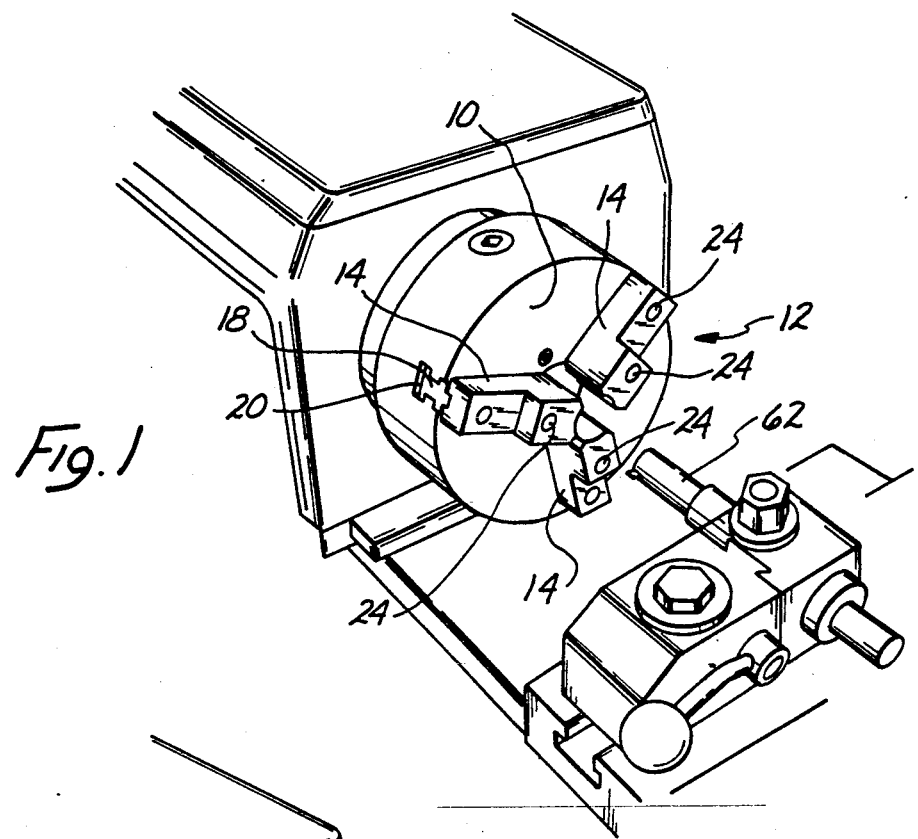
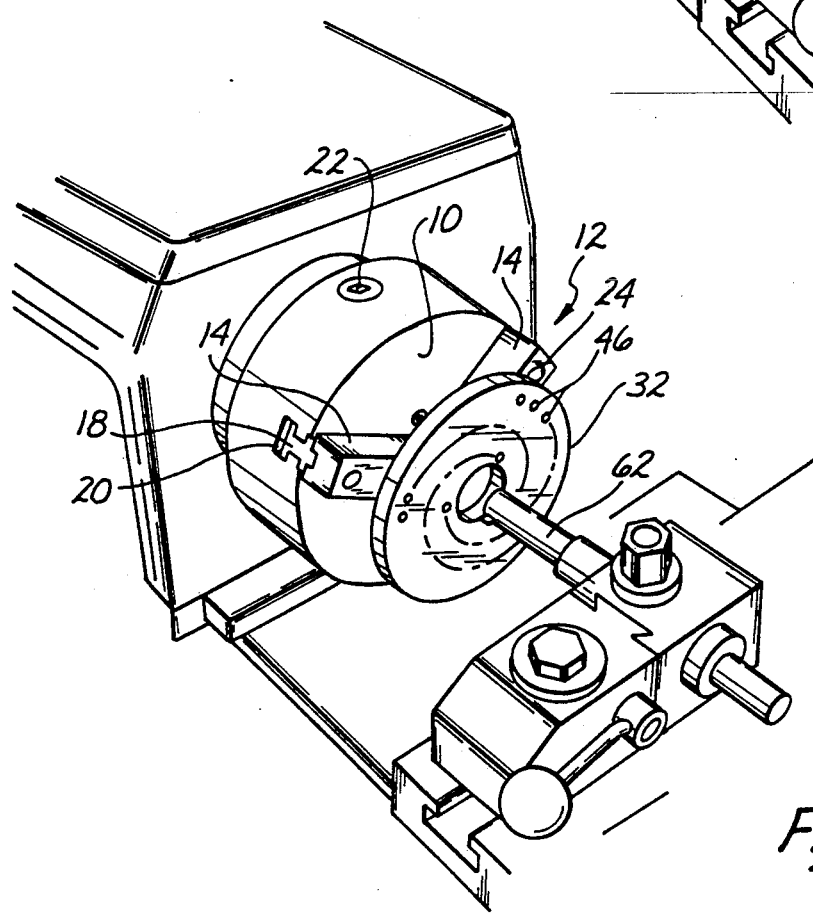

ROTARY CHUCK SOFT JAWS

BRIEF SUMMARY OF THE INVENTION

BACKGROUND AND OBJECTIVES

My invention relates to an improved means and method of securing a selected piece of work by three counterbored soft jaws in a powered rotary chuck.

Soft jaws are substituted for hard jaws in a majority of applications wherein a piece of work is to be held by a rotary chuck, such as in a lathe or the like. The preference for soft jaws instead of hard jaws is for a number of reasons including:

(a) The piece of work may be damaged by hard jaws, due to lack of conformity to the part, when the chuck is tightened in an effort to hold the work securely.

(b) The soft jaws can be shaped to exact conformity to the part so that the piece of work can be fixedly secured in position.

One objective of my invention is to provide means and method to best form such soft jaws.

Soft jaws are used to try to provide maximum accuracy in holding a piece of work in exact concentricity with the center of rotation of the rotary chuck and to try to avoid any relative movement between the piece of work and the rotary chuck. It is an objective of my invention to achieve such exact concentricity and to avoid such relative movement.

Further objectives include to provide a fixture engaging soft jaw counterbores to fixedly hold said soft jaws while they are being shaped to dimensions of a piece of work to be secured thereby; to achieve ease of use of such fixture to save time; to provide a fixture design adapted for use in forming soft jaws for a wide range of parts; and to devise a fixture of low cost, high durability, simplicity of use, high reliability, and minimum maintenance.

My invention will be best understood, together with additional objectives and advantages thereof, from the following description, read with reference to the drawings, in which:

DRAWINGS

FIG. 1 is a perspective view of a rotary chuck having soft jaws installed thereon. Portions of associated lathe equipment are also shown in the view.

FIG. 2 is a view like FIG. 1 also showing a specific embodiment of my invention comprising an annular fixture engaged with the soft jaws to secure the soft jaws while they are being shaped to dimensions of a piece of work to be secured in the jaws.

DESCRIPTION

Figure 3:
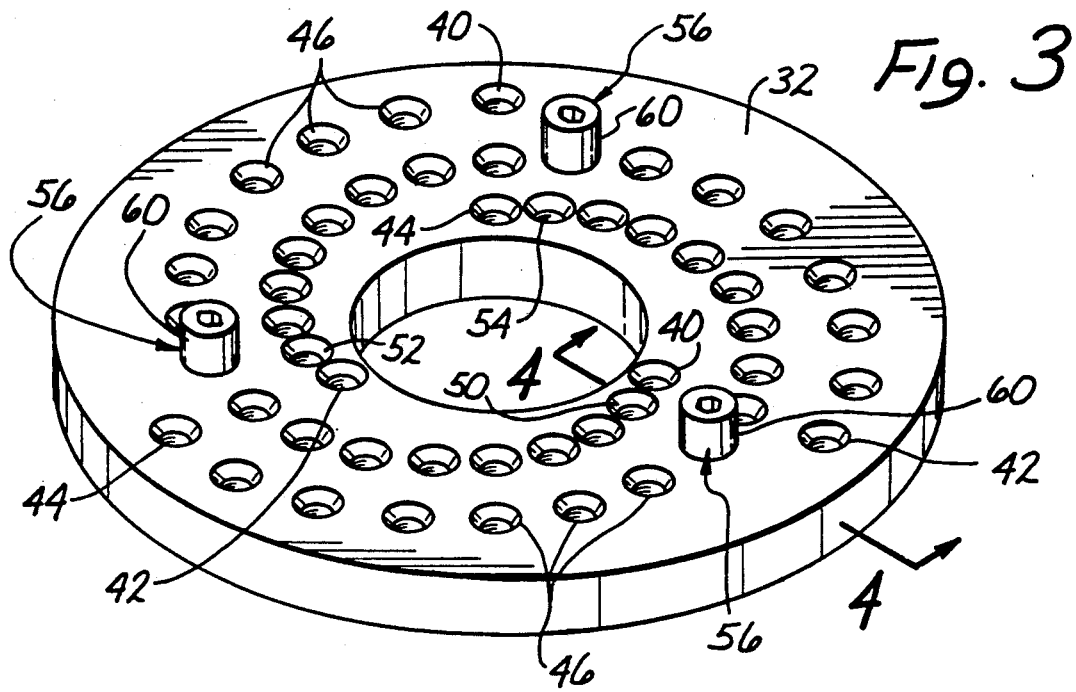
FIG. 3 is an enlarged perspective view of the annular fixture.

FIG. 1 shows a typical powered rotary chuck 10 of a lathe or the like 12. Soft jaws 14 have replaced hard jaws in chuck 10. Either type of jaws are bolted by bolts 16 to carriers 18 mounted in ways 20. Carriers 18 are scrolled in and out by a wrench applied to sockets 22.

Jaws 14 have counterbores 24 in which bolts 16 are countersunk. Special use is made of counterbores 24 in my invention, as will appear from the following description. Usually there are two counterbores 24 for two screws 16 for each jaw 14. The drawings show use of the inner counterbore 24 in each jaw 16 but in some instances the outer counterbore 24 could be used. Counterbores 24 form a solid anchorage.

Jaws 14 are adjustably conjointly fed toward and away from the center of rotation 30 of rotary chuck 10. However, if soft jaws 14 were to be shaped with no more security in positioning than the support of carriers 18 in ways 20, the carriers being held by a scroll feed (not shown) in chuck 10, there would be enough give so that the desirable accuracy of dimensions in shaping jaws 14 to match the dimensions of a piece of work would not be maintained and the exact concentricity of the shape milled or bored in jaws 14 relative to center of rotation 30 would not be achieved. Scrolls do not give the desirable precision and security in positioning of jaws 14. I have designed an annular boring fixture 32 to prevent such give in soft jaws 14 while they are being shaped to dimensions of a piece of work.

Annular boring fixture 32 is located concentric with center of rotation 30 of chuck 10, as shown in FIG. 2, 7, 8a and 8b. As shown particularly in FIG. 3, fixture 32 has three sets 40, 42, 44 of multiple spaced threaded openings 46. Each set 40, 42, 44 is oriented in a like spiral relative to center of rotation 32, so that openings 46 are arranged in triplets of even radiuses from center of rotation 30, i.e., openings 50, 52, 54 in FIG. 3, for example. Of course the openings in each triplet are spaced 120° apart.

Three bolts 56 with threaded shanks 58 are threadedly engaged in three of the openings 46. They are engaged in a triplet of openings 46 of even radiuses from the center of rotation 30. Bolts 56 have heads 60 fitting in three counterbores 24 in soft jaws 14. These bolts 56 are positioned so that heads 60 are located radially relative to center of rotation 30 to fit in those three counterbores 24. Jaws 14 are tightened against heads 60 of bolts 56 with a wrench applied to chuck sockets 22 so that soft jaws are held tightly while the soft jaws 14 are being shaped to the pertinent dimensions of a piece of work such as with the tool 62 shown in FIGS. 1 and 2. It will be understood that the annular shape of fixture 32 leaves a central opening for access by tool 62 to work on the inner surfaces of jaws 14 to conform to the portions of the piece of work to be engaged by jaws 14. Of course soft jaws 14 only have to be shaped to the contour of the piece of work as to those portions of the piece of work to be gripped by jaws 14.

Once three bolts 56 are properly located with shanks 58 in threaded openings 46 and with heads 60 located in aligned counterbores 24, soft jaws 14 can be tightened on heads 60 with a wrench applied to chuck sockets 22; then soft jaws 14 can be shaped to pertinent dimensions of the piece of work with a tool or tools 62; then fixture 32 can be released and removed and the piece of work can be secured in jaws 14; and then operations can be performed on the piece of work as it is being rotated by chuck 10.

The openings 46 in sets of openings 40, 42, 44 are arranged in triplets of threaded openings, as 50, 52, 54, of even radiuses. An example of dimensions is shown in the following table:

| Opening 46 | Radius (in inches) | Angle (6" annulus) | Angle (8" & 11" annuluses) |
|---|---|---|---|
| 1 | 1.0 | 20° | 15° |
| 2 | 1.1 | 40° | 30° |
| 3 | 1.2 | 60° | 45° |
| 4 | 1.3 | 80° | 60° |
| 5 | 1.4 | 90° | 75° |
| 6 | 1.5 | 100° | 90° |
| 7 | 1.6 | 120° | 105° |
| 8 | 1.7 | 140° | 120° |
| 9 | 1.8 | 160° | 135° |

It will be seen that openings 46 in a series 40, 42, or 44 differ in radiuses from center of rotation 30 by 0.100" from one to another.

Annular fixture 32 is preferably formed of 8620 steel case hardened. To be able to handle a range of sizes of parts, fixture 32 can be provided in several sizes. Examples include: a 6" OD, 2.2" ID fixture; a 8" OD, 4.4" ID fixture; and a 11" OD, 6" ID fixture.

Further adaptability for radial distances between counterbores and center of rotation 30 is achieved by providing several sets of bolts with different diameters of heads. The heads 60 are preferably generally cylindrical in shape. Examples include:

| Dash | Head (diameter in inches) |
|---|---|
| -1 | .400 |
| -2 | .450 |
| -3 | .500 |
| -4 | .550 |

Figure 4:
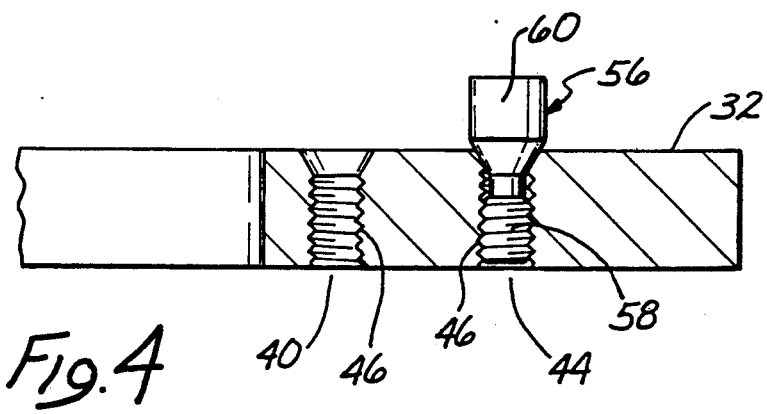
FIG. 4 is an enlarged view, partly in section, taken on line 4—4 of FIG. 3.
Figure 5:
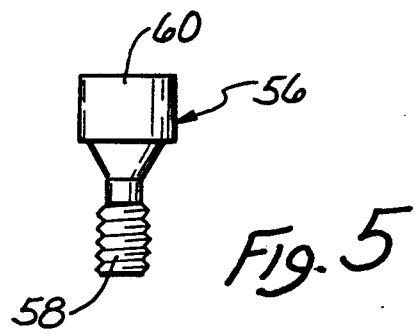
FIG. 5 is an elevational view of a bolt of larger diameter than that seen in FIG. 4.
Figure 6:
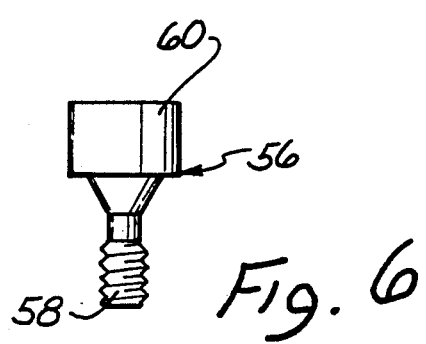
FIG. 6 is a view like FIG. 5 but showing a bolt with a head of larger diameter than that seen in FIG. 5.
Figure 7:
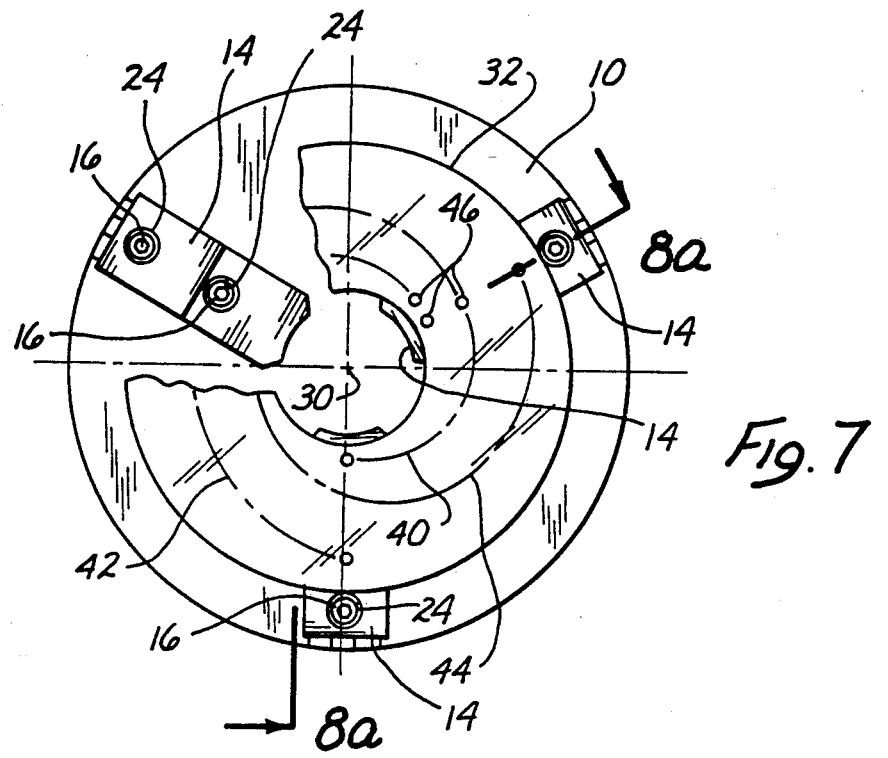
FIG. 7 is an elevational view of the face of the chuck and the face of an annular fixture installed on the chuck. A portion of the fixture is broken away to better show a soft jaw behind the fixture.
Figures 8A, 8B:
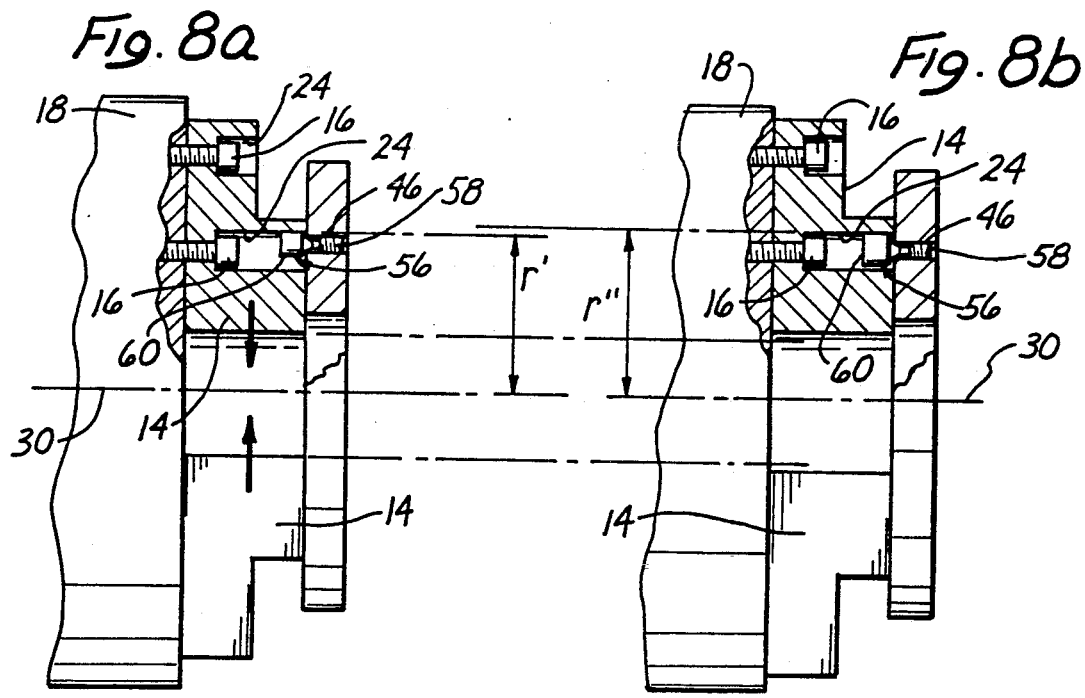
FIG. 8a is a partial, enlarged view taken on line 8a—8a of FIG. 7. The view is partly in section.
FIG. 8b is a view like FIG. 8(a) but with a different diameter bolt head engaging the soft jaw.

These would all fit in a 0.600" diameter counterbore, for example. They differ in diameters by 0.050". It will be noted that the bolt heads depicted in FIGS. 4, 5 and 6 are progressively greater in diameter. Referring to FIGS. 8a and 8b, the diameter bolt head 60 shown in FIG. 8b is larger than the diameter bolt head 60 shown in FIG. 8a. The radius r' in FIG. 8a from center of rotation 30 to the opposite side of counterbore 24 is less than the radius r" in FIG. 8b from center of rotation 30 to the opposite side of counterbore 24. This demonstrates how the different positions of soft jaws 14 relative to center of rotation 30 can be accommodated by (a) the selection of a particular set of openings 46 in annular boring fixture 32, and (b) the selection of a set of bolts 56 of a particular diameter of bolt heads 60. These adjustments in effective positions of bolt heads 60 relative to counterbores 24 and center of rotation 30 permit final adjustment of position of soft jaws 14 to be effected when soft jaws 14 are tightened on bolt heads 60.

Having thus described my invention, I do not wish to be understood as limiting myself to the exact details described, but instead wish to cover those modifications thereof that will occur to those skilled in this art upon examining my disclosure and which are properly within the scope of the following claims.

I claim:

1. Improvement in means to secure a selected piece of work counterbored soft jaws in a powered rotary chuck, such as in a lathe or the like, said jaws being adjustably conjointly fed toward and away from the center of rotation of said chuck, comprising:
   (a) said soft jaws being adjusted to approximately the right radiuses from said center of rotation to effectively hold said selected piece of work,
   (b) an annular boring fixture located concentric with said center and having three sets of multiple spaced threaded openings, therein, each set being oriented in a like spiral relative to said center so that said openings are arranged in triplets of even radiuses from said center,
   (c) three bolts with threaded shanks threadedly engaged in three of said threaded openings, said bolts having heads fitting in the counterbores in said jaws, said bolts being positioned so that said heads are located radially relative to said center to fit in the counterbores in said jaws, said jaws being tightened on said heads of said bolts, whereby said soft jaws can then be shaped to the pertinent dimensions of said piece of work, then said fixture can be released and removed, then said piece of work can be secured in said jaws, and then operations can be performed on said piece of work as it is being rotated in said chuck.

2. The means of claim 1 in which there are provided several sets of bolts with different diameters of heads, whereby one of said sets of bolts can be selected that best fits the distance from said counterbores to said center.

3. The means of claim 1 in which said triplets of openings of even radiuses are spaced about 0.100" differently from one triplet to another in said spirals.

4. The means of claim 2 in which said sets of bolts have heads differing in diameters about 0.050".

5. The means of claim 2 which said bolt heads are generally cylindrical and said triplets of openings of even radiuses are spaced about 0.100" differently from one triplet to another in said spirals and said sets of bolts have heads differing in diameters about 0.050".

6. The means of claim 1 in which each bolt has a tapering surface on its head in the direction of the shanks of the bolt and in which each threaded opening has an outwardly flaring surface matching said tapering surface whereby said bolts can be fixedly secured in said threaded openings by abutment of said tapering surface to said flaring surface.

7. Improvement in method of securing a selected piece of work by three counterbored soft jaws in a powered rotary chuck, such as in a lathe or the like, said jaws being adjustably conjointly fed toward and away from the center of rotation of said chuck, comprising:
   (a) adjusting said soft jaws to approximately the right radiuses from said center of rotation spacing of said jaws for minimum shaping of said soft jaws to effectively hold said selected piece of work,
   (b) providing an annular boring fixture and providing three sets of multiple spaced threaded openings therein and orienting each set in a like spiral relative to said center so that said openings are arranged in triplets of even radiuses from said center,
   (c) providing three bolts with threaded shanks and threadedly engaging said bolts in three of said threaded openings, said bolts having heads fitting in the counterbores in said jaws, and positioning said bolts so that said heads thereof are located radially relative to said center to fit in the counterbores in said jaws, and then tightening said jaws on said heads of said bolts, (d) shaping said soft jaws to the pertinent dimensions of said piece of work, (e) releasing and removing said fixture and placing said piece of work in said soft jaws and tightening said jaws, and (f) performing operations on said piece of work while it is being rotated by said chuck.

8. In the method of claim 7, providing bolts with several sizes of diameters of heads and in fitting said heads of said bolts in said counterbores selecting heads of such diameters as will best suit the radiuses from said counterbores to said center.

* * * * *